United States Patent Office 2,706,728
Patented Apr. 19, 1955

2,706,728

ALPHA-FLUOROACYLAMINOMETHYL ACRYLONITRILES AND POLYMERS THEREOF

Harry W. Coover, Jr., and Joseph B. Dickey, Kingsport, Tenn., assignors to Eastman Kodak Company, Rochester, N. Y., a corporation of New Jersey No Drawing. Application July 15, 1953,
Serial No. 368,213

12 Claims. (Cl. 260—85.5)

This invention relates to alpha-fluoroacylaminomethyl acrylonitriles, to polymers thereof, and to a process for their preparation.

This application is a continuation-in-part of our copending application Serial No. 218,266, filed March 29, 1951 (now U. S. Patent No. 2,659,715, dated November 17, 1953).

The new compounds of the invention are represented by the following general structural formula:

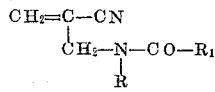

wherein R represents an atom of hydrogen or the group —CO—$R_1$, and $R_1$ represents a fluoroalkyl group containing from 1 to 3 carbon atoms (e. g. —$CH_2F$, —$CHF_2$, —$CF_3$, —$CH_2$—$CF_3$, —$CF_2$—$CF_3$, —$CF_2$—$CH_3$, —$CH_2$—$CF_2$—$CH_3$, etc. groups). The new compounds of the invention above defined are useful for preparing homo and copolymers which are characterized by improved solubility in common organic solvents such as acetone, acetic acid, acetonitrile, etc., when compared with corresponding polymers of acrylonitrile, and which are further characterized by improved heat stability and high flame resistance. Certain of the copolymers such as those containing a major proportion of acrylonitrile are particularly useful for fiber-making purposes and show good dyeing properties.

It is accordingly an object of the invention to provide new derivatives of methacrylonitrile. Another object is to provide resinous polymers of the same. Another object is to provide a process for preparing the new compounds and polymers thereof. Other objects will become apparent hereinafter.

In accordance with the invention, we prepare the new monomeric compounds by reacting alpha-aminomethyl acrylonitrile with a saturated fluorocarboxylic acid anhydride in an oxygen-free inert medium such as ether, and separating the alphafluoroacylaminomethyl acrylonitrile which forms from the reaction by distillation under reduced pressure. The temperature of reaction can vary from about 0° to 50° C. To obtain those of our compounds which contain a single —CO—$R_1$ group, we react approximately equimolar quantities of alpha-aminomethyl acrylonitrile and the particular anhydride of a fluorocarboxylic acid desired. However, to obtain those of our compounds which contain two —CO—$R_1$ groups, we react two or more gram moles of the fluorine containing anhydride with each gram-mole of alpha-aminomethyl acrylonitrile. Mixtures of anhydrides can also be used to obtain two different —CO—$R_1$ groups in the product by the latter process. Suitable fluorocarboxylic acid anhydrides which can be used to prepare our new monomeric compounds include trifluoroacetic anhydride, difluoroacetic anhydride, pentafluoropropionic anhydride, $\alpha,\alpha$-difluoropropionic anhydride, $\beta,\beta$-difluorobutyric anhydride, $\beta,\beta,\beta$-trifluoropropionic anhydride, etc.

The polymerization of the new compounds of the invention alone or conjointly with one or more other unsaturated organic compounds is accelerated by heat, by actinic light and by polymerization catalysts which are known to promote the polymerization of vinyl and other unsaturated organic compounds such as peroxides, e. g., benzoyl peroxide, acetyl peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkalimetal perborates, the water-soluble salts of percarbonic acid, the water-soluble salts of perphosphoric acid, etc. The organic peroxides are especially suitable. Mixtures of catalysts can be employed. An activating agent such as sodium bisulfite can be used, if desired, in conjunction with the polymerization catalysts.

The polymerizations can be carried out in mass or dispersed in a nonsolvent for the monomers, the particles of dispersed monomer being very small (emulsion) or relatively large (bead or granular). For emulsion polymerization, any nonsolvent for the monomers can be employed, water being especially advantagous. The monomer or mixture of monomers can be advantageously emulsified in the water using emulsifying agents such as salts of higher fatty acids (e. g., sodium or potassium stearate, palmitate, etc.), ordinary soaps, salts of higher fatty alcohol sulfates (e. g., sodium or potassium cetyl sulfate, sodium or potassium lauryl sulfate, sodium or potassium stearyl sulfate, etc.), salts of aromatic sulfonic acids (e. g., sodium or potassium salts of alkylnaphthalene sulfonic acids, etc.) and higher molecular weight quaternary ammonium salts (e. g., dimethylbenzylphenyl ammonium chloride, etc.). For bead or granular polymerization relatively poor dispersing agents such as starch, methylated starch, gum arabic, polyvinyl alcohol, partly hydrolyzed polyvinyl acetate, gelatin, sodium glycolate and finely divided magnesium carbonate, etc., can be employed. Mixtures of dispersing agents can be used. In the polymerizations wherein the monomers are dispersed in nonsolvents, the dispersions can be facilitated by stirring, shaking or tumbling the polymerization mixtures. Continuous methods of polymerization can also be employed.

The new monomers of the invention readily copolymerize with each other in any proportions or with one or more other polymerizable unsaturated compounds containing the basic vinyl group $CH_2=CH$— to give high molecular weight resinous polymers, for example, any of the new compounds with vinyl esters of carboxylic acids (e. g., vinyl acetate, vinyl butyrate, vinyl stearate, vinyl trifluoroacetate, vinyl benzoate, etc.), vinyl alkyl ketones (e. g., methyl vinyl ketone, ethyl vinyl ketone, trifluoromethyl vinyl ketone, etc.), vinyl alkyl ethers (e. g., methyl vinyl ether, butyl vinyl ether, etc.), vinyl sulfonamides (e. g., vinyl sulfonamide, N-methyl vinyl sulfonamide, etc.), vinyl halides (e. g., vinyl chloride, vinyl bromide, and vinyl fluoride), vinyl alkyl sulfones (e. g., vinyl methyl sulfone, vinyl ethyl sulfone, etc.), vinyl urethanes (e. g., vinyl methyl urethane, vinyl ethyl urethane, etc.), cyclic vinyl imides (e. g., vinyl succinimide, vinyl phthalimide, etc.), acrylic acid and its anhydride, amide, N-alkyl amide, nitrile, and the methyl, ethyl, butyl, benzyl and phenyl esters, etc.). Other unsaturated compounds which can be copolymerized with our new monomers include methacrylic acid and its anhydride, amide, N-alkyl amides, nitrile, and the methyl, ethyl, butyl, benzyl and phenyl esters, vinylidene dicloride, vinylidene chloride-fluoride, alkyl esters of maleic and fumaric acids such as methyl maleate, methyl fumarate, fumaronitrile, cis- and trans-$\beta$-cyano and carboxamido-methyl acrylate, and the like. The polymers and copolymers of the invention are soluble in one or more volatile solvents such as acetone, methyl ethyl ketone, acetonitrile, dimethyl formamide, dimethylacetamide, etc.

The copolymers of the invention can contain variable amounts of each comonomer and are obtained with starting polymerization mixtures containing from 5% to 95% by weight of the new unsaturates and from 95% to 5% by weight of the above mentioned other unsaturated organic compounds. The copolymers have been found to contain substantially the same proportion of substituents as employed in the polymerization mixtures. The temperature of the polymerizations can be varied widely. Where a polymerization activating agent is employed, the polymerization will take place at a temperature as low as 0° C. However, the preferred temperature range for the polymerizations is from 25° C. to 130° C. Where the polymerization is carried out in an inert solvent or in suspension in a nonsolvent, the monomers advantageously constitute from 5% to 50% by weight of the mixture.

The following examples will serve to illustrate further our new unsaturates, polymers thereof, and the manner of preparing the same.

*Example 1.—Alpha-trifluoroacetaminomethyl acrylonitrile*

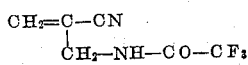

21 g. of trifluoroacetic anhydride were added dropwise with stirring to an oxygen-free solution of 7.2 g. of alpha-aminomethyl acrylonitrile in ether. The product, alpha-trifluoroacetaminomethyl acrylonitrile, was isolated by fractional distillation of the residual mixture under reduced pressure. It had a boiling point of 101°–103° C./1 mm. pressure.

The alpha-aminomethyl acrylonitrile used in the above example was prepared as follows: 50 g. of acetamide were dissolved in 200 cc. of dry peroxide-free 1,4-dioxane in a 1-liter flask provided with a reflux condenser, a dropping funnel and a gas inlet tube. Nitrogen was passed through the flask to remove oxygen, then 2.3 g. of sodium were added and the reaction mixture was warmed to complete the formation of the intermediate N-sodium acetamide. Then 14.6 g. of alpha-bromomethyl acrylonitrile were added dropwise, with stirring, at about 0° C. The reaction mixture was then warmed to complete the reaction and the sodium bromide which formed was filtered off. The filtrate was fractionally distilled under reduced pressure to give a colorless compound, alpha-acetaminomethyl acrylonitrile, B. P. 120°–123° C./0.5 mm. pressure.

124 g. of alpha-acetaminomethyl acrylonitrile prepared as above described were stirred at room temperature, with the exclusion of air, in a mixture of 1000 cc. of water and 200 cc. of 35% hydrochloric acid in the presence of hydroquinone. The mixture was gently warmed to complete the hydrolysis. It was then neutralized with sodium bicarbonate, extracted with ether, dried and distilled under reduced pressure to give alpha-aminomethyl acrylonitrile, a colorless liquid of B. P. 49°–53° C./3 mm. pressure.

*Example 2.—Alpha - N - difluoroacetaminoethylacrylonitrile*

One-tenth mole of difluoroacetic anhydride was added dropwise with stirring to an oxygen-free solution of 7.2 g. of alpha-aminomethylacrylonitrile in ether. After the addition was completed, the ether was distilled off and the difluoroacetic acid was recovered by vacuum distillation. The compound was purified by distillation under reduced pressure, B. P. 99–101 at 0.1 mm.

*Example 3.—Alpha-pentafluoropropionaminomethylacrylonitrile*

One-tenth mole of pentafluoropropionic anhydride was added dropwise with stirring to an oxygen-free solution of 7.2 g. of alpha-aminomethylacrylonitrile in ether. After the reaction was completed, the ether and pentafluoropropionic acid were recovered by distillation. The compound was purified by distillation under reduced pressure, B. P. 69–70 at 0.1 mm.

*Example 4.—Alpha - ($\alpha,\alpha$-difluoropropionaminomethyl)-acrylonitrile*

One-tenth mole of $\alpha,\alpha$-difluoropropionic anhydride was added dropwise with stirring to an oxygen-free solution of 7.2 g. of alpha-aminomethylacrylonitrile in ether. After the reaction was completed, the ether and difluoropropionic acid were recovered by distillation. The product was purified by distillation under reduced pressure, B. P. 93–95 at 0.1 mm.

*Example 5.—Alpha - ($\beta,\beta$ - difluorobutyraminomethyl)-acrylonitrile*

One-tenth mole of $\beta,\beta$-difluorobutyric anhydride was added dropwise with stirring to an oxygen-free solution of 7.2 g. of alpha-aminomethylacrylonitrile in ether. After the reaction was completed, the ether and difluorobutyric acid were recovered by distillation. The product was purified by distillation under reduced pressure, B. P. 105–107 at 0.1 mm.

*Example 6.—Alpha-($\beta,\beta,\beta$-trifluoropropionaminomethyl)-acrylonitrile*

One-tenth mole of $\beta,\beta,\beta$-trifluoropropionic anhydride was added dropwise with stirring to an oxygen-free solution of 7.2 g. of alpha-aminomethylacrylonitrile in ether. After the reaction was completed, the ether and trifluoropropionic acid were recovered by distillation. The product was purified by distillation under reduced pressure, B. P. 96–98 at 0.1 mm.

*Example 7*

5 g. of alpha-trifluoroacetaminomethyl acrylonitrile and 0.2 g. of benzyl peroxide were placed in a sealed tube. Polymerization was completed by heating at 70° C. for 24 hours. A clear, viscous solution was obtained.

*Example 8*

10 g. of alpha-trifluoroacetaminomethylacrylonitrile and 0.2 g. of benzoyl peroxide were placed in a sealed tube. The polymerization was completed by heating at 90° C. for 48 hours. A clear, hard polymer soluble in acetone was obtained.

*Example 9*

10 g. of alpha-($\beta,\beta,\beta$-trifluoropropionaminomethyl)-acrylonitrile and 0.2 g. of benzyl peroxide were placed in a sealed tube. Polymerization was completed by heating at 90° C. for 48 hours. A clear, hard polymer soluble in acetonitrile was obtained.

*Example 10*

2 g. of alpha-difluoroacetaminomethylacrylonitrile and 8 g. of acrylonitrile were added to 100 ml. of water containing 0.2 g. of potassium persulfate and 0.2 g. of sodium bisulfite. Polymerization began immediately and was complete within 12 hours. The precipitated polymer was isolated by filtration. The polymer is soluble in such solvents as dimethylacetamide and dimethylformamide, and has a softening point above 190° C.

*Example 11*

9 g. of alpha-pentafluoropropionaminomethylacrylonitrile, 1 g. of styrene and 0.2 g. of lauroyl peroxide were placed in a sealed tube. Polymerization was completed by heating at 80° C. for 30 hours. A clear, hard polymer soluble in acetonitrile was obtained.

*Example 12*

9 g. of methylmethacrylate, 1 g. of alpha-($\alpha,\alpha$-difluoropropionaminomethyl)acrylonitrile and 0.3 g. of benzoyl peroxide were placed in a sealed tube. Polymerization was completed by heating at 80° C. for 48 hours. A clear, hard polymer soluble in acetone was obtained.

*Example 13*

2 g. of alpha-($\beta,\beta$-difluorobutyraminomethyl)acrylonitrile and 8 g. of vinyl chloride were added to 100 ml. water containing 0.2 g. potassium persulfate, 0.2 g. sodium bisulfite and 2 g. potassium laurate in a pressure bottle. The reaction mixture was allowed to warm up to room temperature and polymerization began immediately and was complete within 12 hours. The polymer was precipitated by the addition of a saturated salt solution. The precipitated polymer was filtered, washed and dried. The polymer is readily soluble in such solvents as dimethylformamide and dimethylacetamide.

*Example 14.—Copolymer of alpha-trifluoroacetaminomethyl acrylonitrile and methacrylonitrile*

5 g. of alpha-trifluoroacetaminomethyl acrylonitrile, 5 g. of methacrylonitrile and 0.3 g. of benzoyl peroxide were placed in a sealed tube. Polymerization was completed by heating at 70° C. for 48 hours. A clear, hard polymer soluble in acetone was obtained.

By proceeding as set forth in the examples, other copolymers of similar properties can be prepared, for example, from monomeric mixtures containing 10%, 15%, 25%, 30%, 40%, 60%, 70% or 80% by weight of the total unsaturates of one or more of the new monomers of the invention, the remainder of the unsaturates in the mixtures being in each case selected from one or more of the other unsaturates mentioned as suitable for copolymerizing therewith. The copolymers prepared in accordance with the invention can be extruded from their solutions to form flexible filaments suited for spinning into yarns or coated from such solutions to form films suitable as photographic film supports, sheets, etc. Plasticizers, fillers, dyes, etc., can be incorporated into such compositions.

What we claim is:

1. An alpha-fluoroacylaminomethyl acrylonitrile represented by the general structural formula:

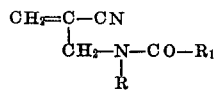

wherein R represents a member selected from the group consisting of an atom of hydrogen and the group —CO—$R_1$, and $R_1$ represents a fluoroalkyl group containing from 1 to 3 carbon atoms.

2. Alpha-trifluoroacetaminomethyl acrylonitrile.
3. Alpha-difluoroacetaminomethyl acrylonitrile.
4. Alpha - pentafluoropropionaminomethyl acrylonitrile.
5. Alpha-($\alpha,\alpha$-difluoropropionaminomethyl) - acrylonitrile.
6. Alpha - ($\beta,\beta$ - difluorobutyraminomethyl)-acrylonitrile.
7. A polymer of an alpha-fluoroacylaminomethyl acrylonitrile represented by the general structural formula:

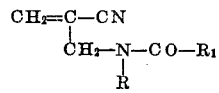

wherein R represents a member selected from the group consisting of an atom of hydrogen and the group —CO—$R_1$, and $R_1$ represents a fluoroalkyl group containing from 1 to 3 carbon atoms.

8. A copolymer of from 5 to 95% by weight of alpha-trifluoroacetaminomethyl acrylonitrile and from 95 to 5% by weight of methacrylonitrile.

9. A copolymer of from 5 to 95% by weight of alpha-difluoroacetaminomethyl acrylonitrile and from 95 to 5% by weight of acrylonitrile.

10. A copolymer of from 5 to 95% by weight of alpha-pentafluoropropionaminomethyl acrylonitrile and from 95 to 5% by weight of styrene.

11. A copolymer of from 5 to 95% by weight of alpha - ($\alpha,\alpha$ - difluoropropionaminomethyl)-acrylonitrile and from 95 to 5% by weight of methyl methacrylate.

12. A copolymer of from 5 to 95% by weight of alpha-($\beta,\beta$-difluorobutyraminomethyl)-acrylonitrile and from 95 to 5% by weight of vinyl chloride.

No references cited.